Figure 5:
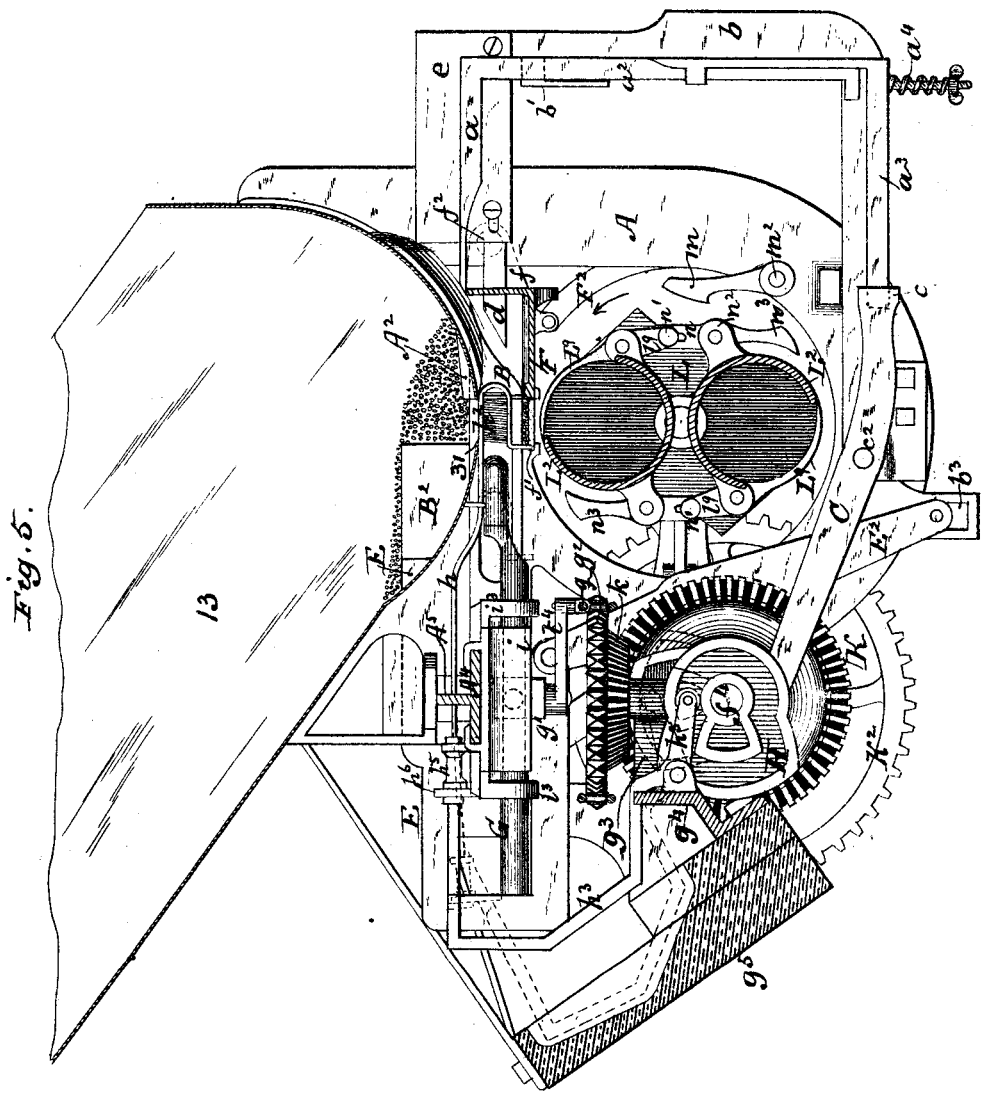

(No Model.)
13 Sheets—Sheet 1.
H. TUTTLE.
GRAIN BINDER BAND MAKING MACHINE.
No. 547,696.
Patented Oct. 8, 1895.
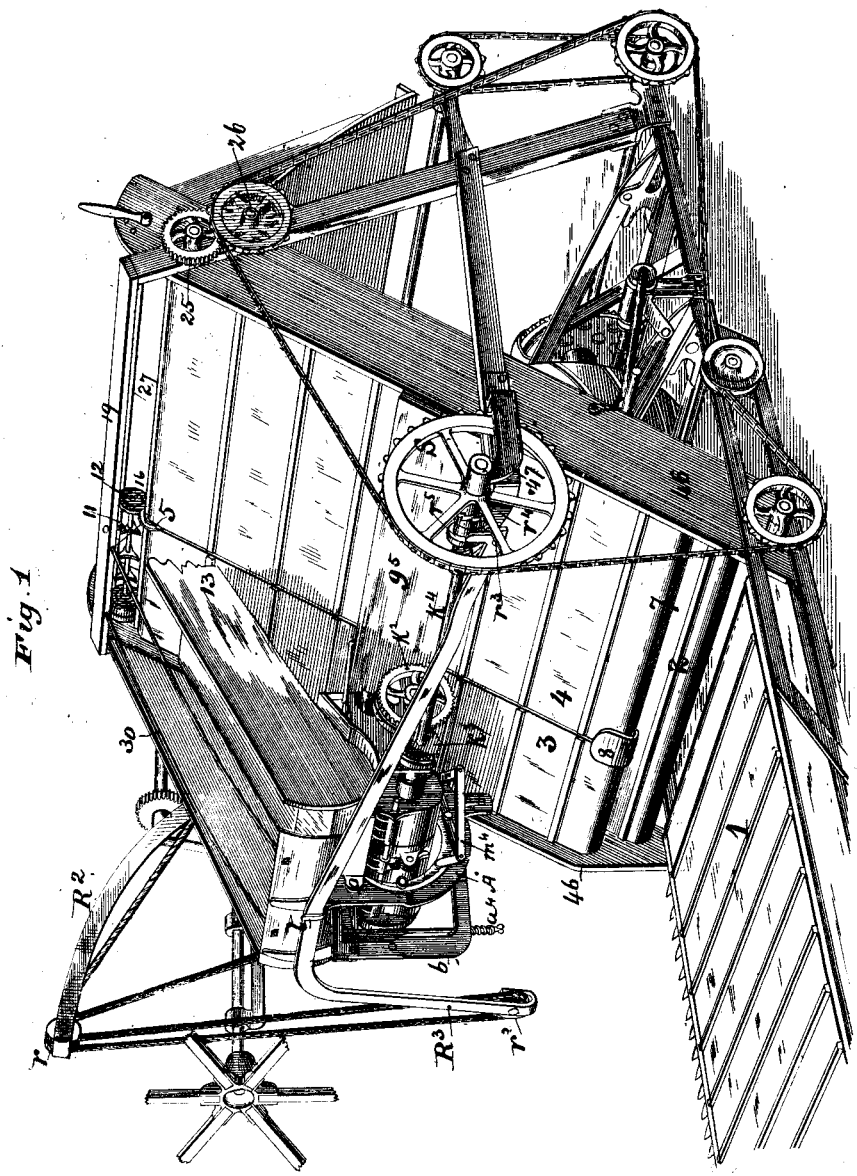
Witnesses:
Harry L. Amer.
J.J. Masson
Inventor
Hosmer Tuttle
by E.E. Masson
atty

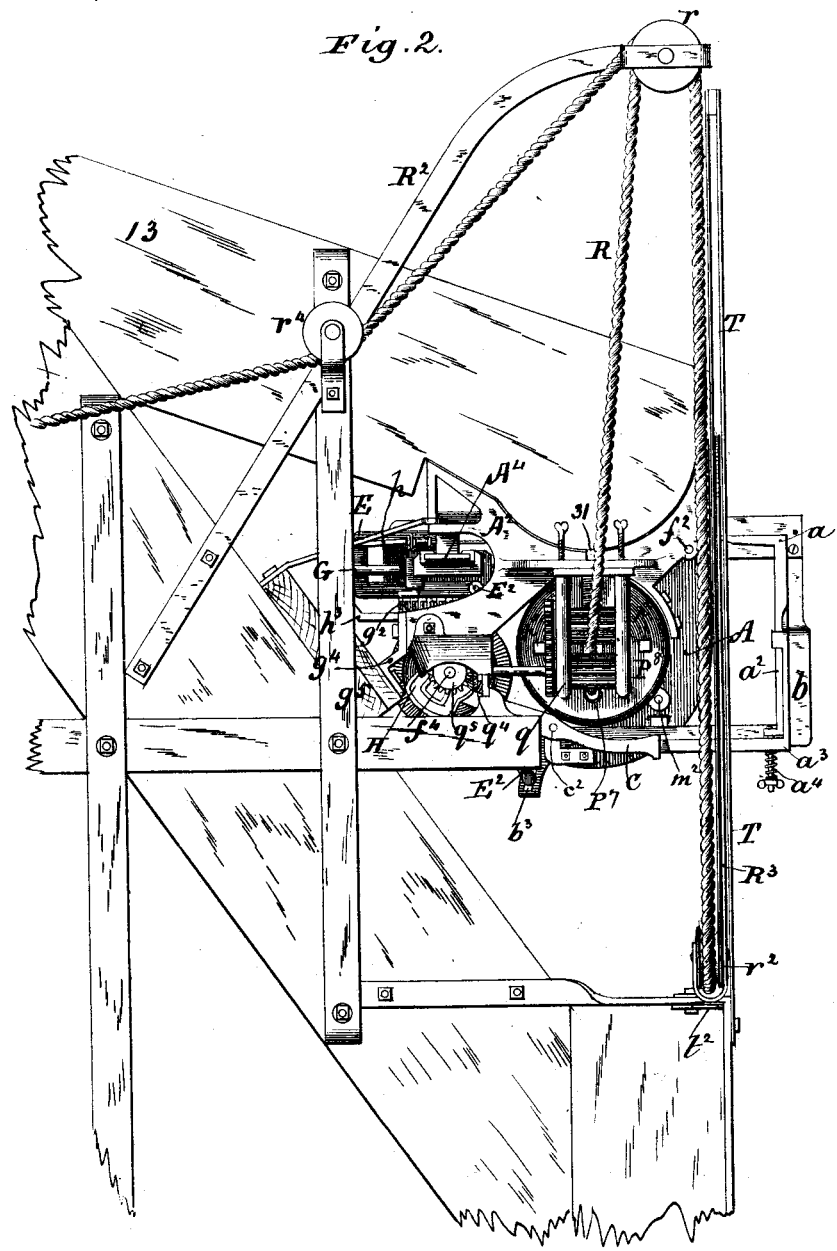

(No Model.) 13 Sheets—Sheet 3.
H. TUTTLE.
GRAIN BINDER BAND MAKING MACHINE.
No. 547,696. Patented Oct. 8, 1895.
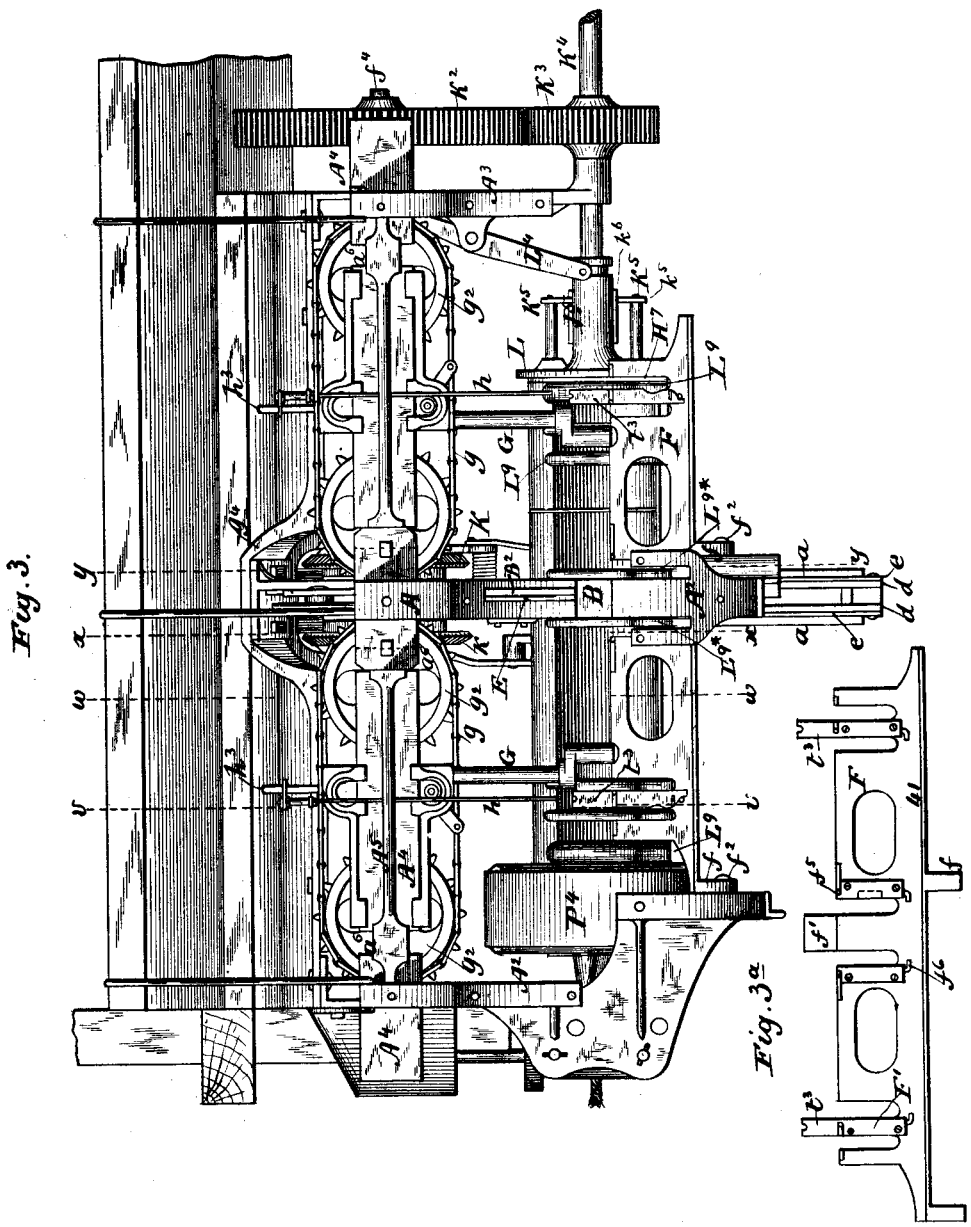
Witnesses
Harry L. Amer
I. J. Masson
Inventor:
Hosmer Tuttle,
by E. E. Masson
atty.

(No Model.) 13 Sheets—Sheet 4.
H. TUTTLE.
GRAIN BINDER BAND MAKING MACHINE.
No. 547,696. Patented Oct. 8, 1895.
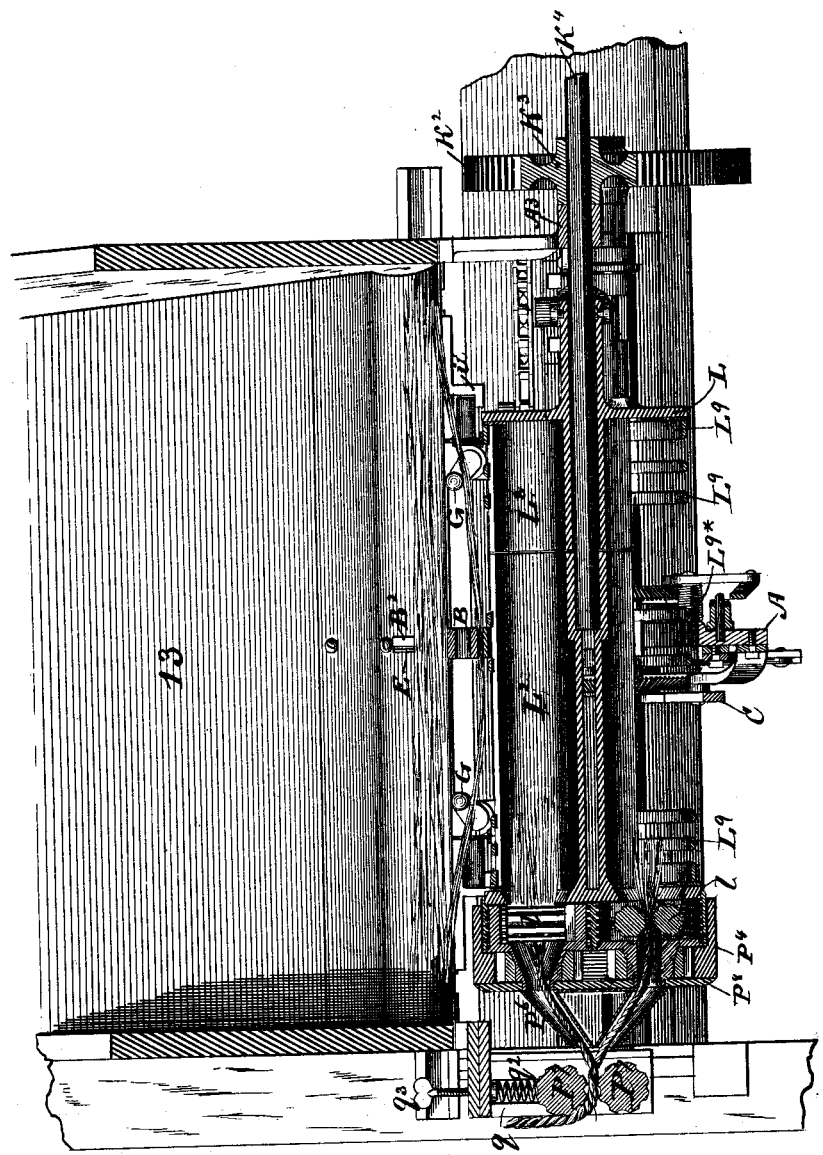
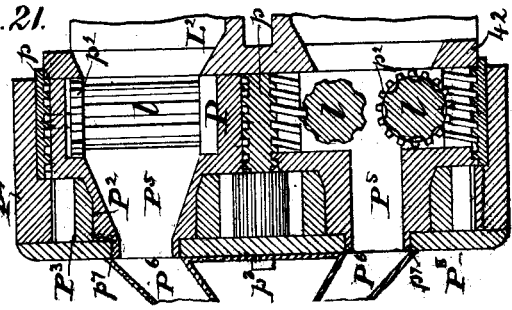
Witnesses
Harry L. Amer
I. J. Masson
Inventor
Hosmer Tuttle
by E.E. Masson
atty.

(No Model.) 13 Sheets—Sheet 5.

H. TUTTLE.
GRAIN BINDER BAND MAKING MACHINE.

No. 547,696. Patented Oct. 8, 1895.

Witnesses:
Harry L. Amer
S. J. Masson

Inventor:
Hosmer Tuttle,
by E. E. Masson
atty.

(No Model.) 13 Sheets—Sheet 6.
H. TUTTLE.
GRAIN BINDER BAND MAKING MACHINE.

No. 547,696. Patented Oct. 8, 1895.

Witnesses:
Harry L. Amer.
J.J. Masson

Inventor:
Hosmer Tuttle
by E.E. Masson
atty (No Model.) 13 Sheets—Sheet 7.

H. TUTTLE.
GRAIN BINDER BAND MAKING MACHINE.

No. 547,696. Patented Oct. 8, 1895.

Witnesses.
Harry L. Ames
I. J. Masson

Inventor:
Hosmer Tuttle,
by E. E. Masson
atty.

(No Model.) 13 Sheets—Sheet 8.
H. TUTTLE.
GRAIN BINDER BAND MAKING MACHINE.
No. 547,696. Patented Oct. 8, 1895.
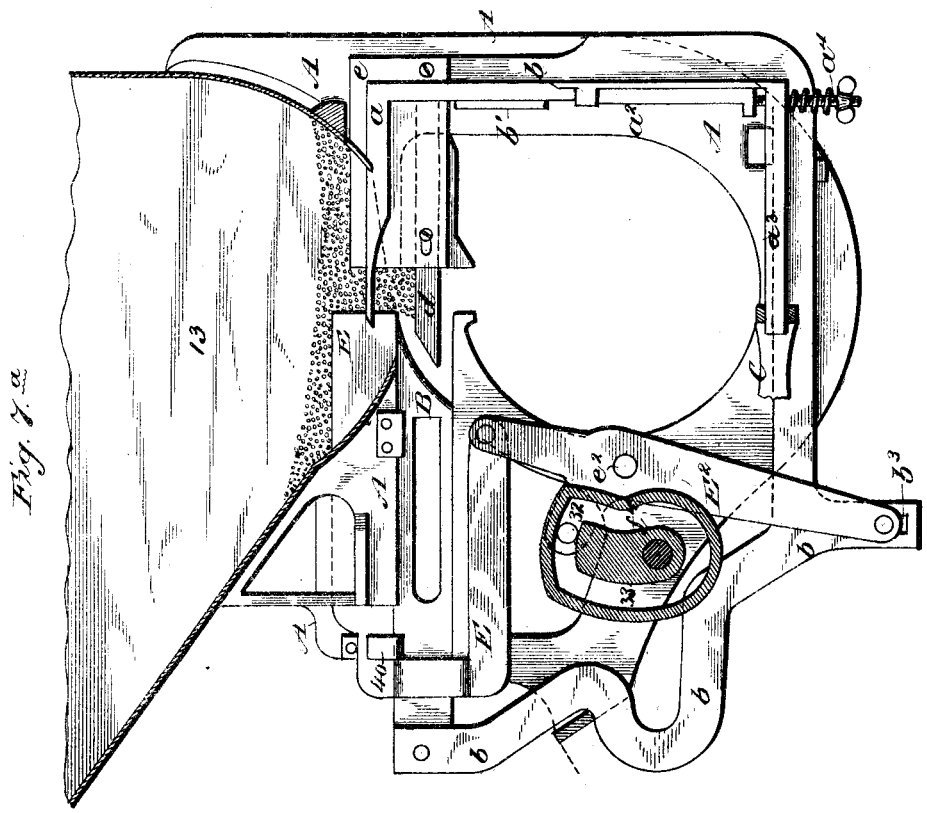
Fig. 7ª
Witnesses:
L. C. Hills
J. J. Masson
Inventor:
Hosmer Tuttle,
by E. E. Masson
atty.

(No Model.) 13 Sheets—Sheet 9.
H. TUTTLE.
GRAIN BINDER BAND MAKING MACHINE.

No. 547,696. Patented Oct. 8, 1895.

Witnesses:
Harry L. Amer.
I. J. Masson

Inventor
Hosmer Tuttle
by E. E. Masson
atty.

(No Model.) 13 Sheets—Sheet 10.

H. TUTTLE.
GRAIN BINDER BAND MAKING MACHINE.

No. 547,696. Patented Oct. 8, 1895.

Witnesses:
Harry L. Amer
J. J. Masson

Inventor:
Hosmer Tuttle
by E. E. Masson
atty.

(No Model.) 13 Sheets—Sheet 11.
H. TUTTLE.
GRAIN BINDER BAND MAKING MACHINE.
No. 547,696. Patented Oct. 8, 1895.
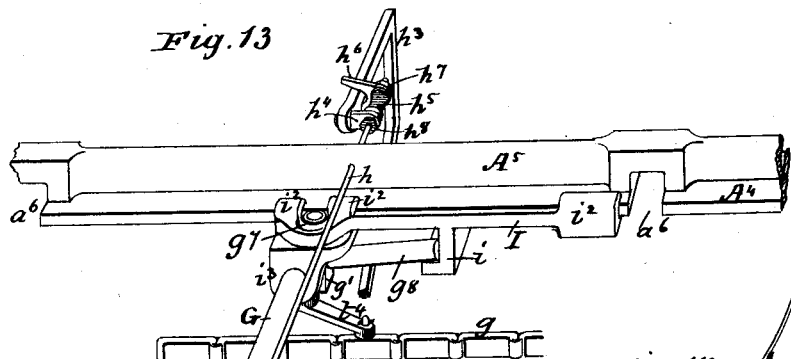
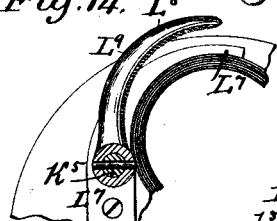
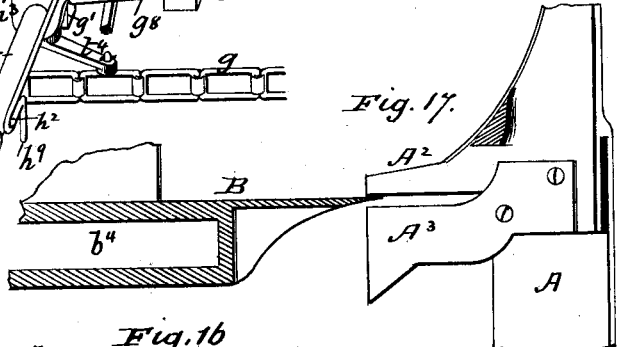
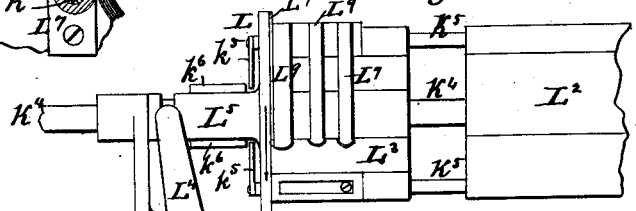
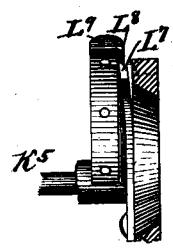
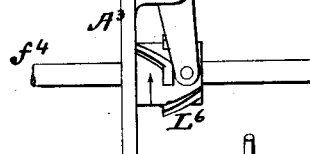
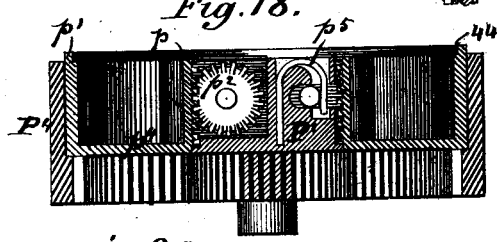
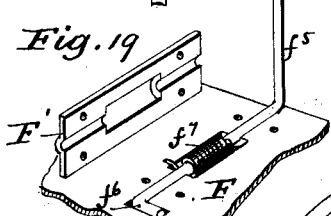
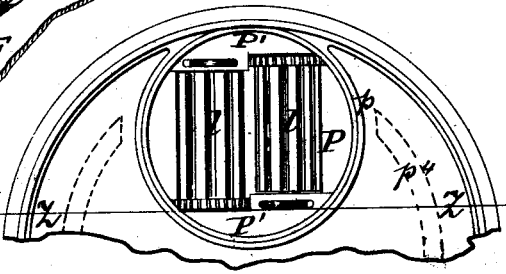
Witnesses
Harry L. Amer
I. J. Masson
Inventor:
Hosmer Tuttle,
by E. E. Masson
atty.

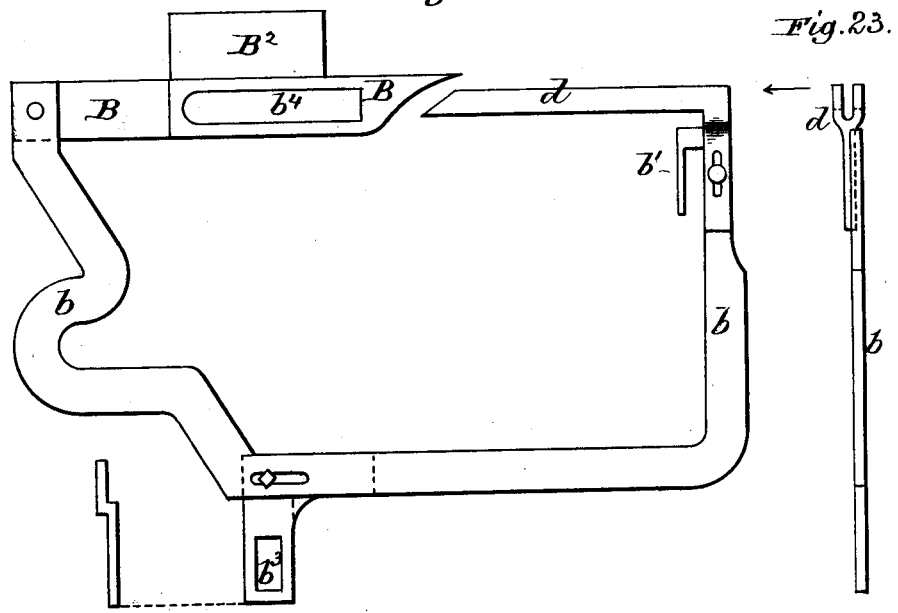
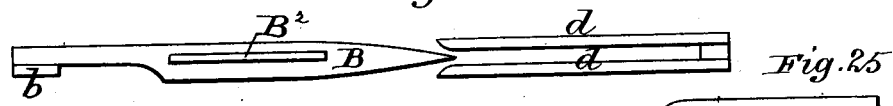
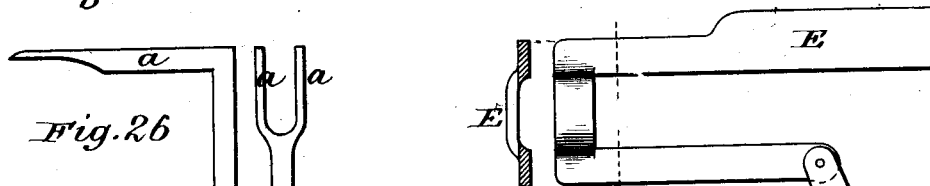
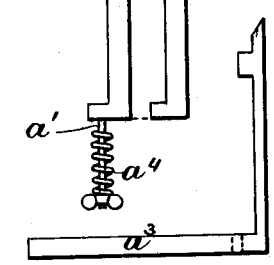

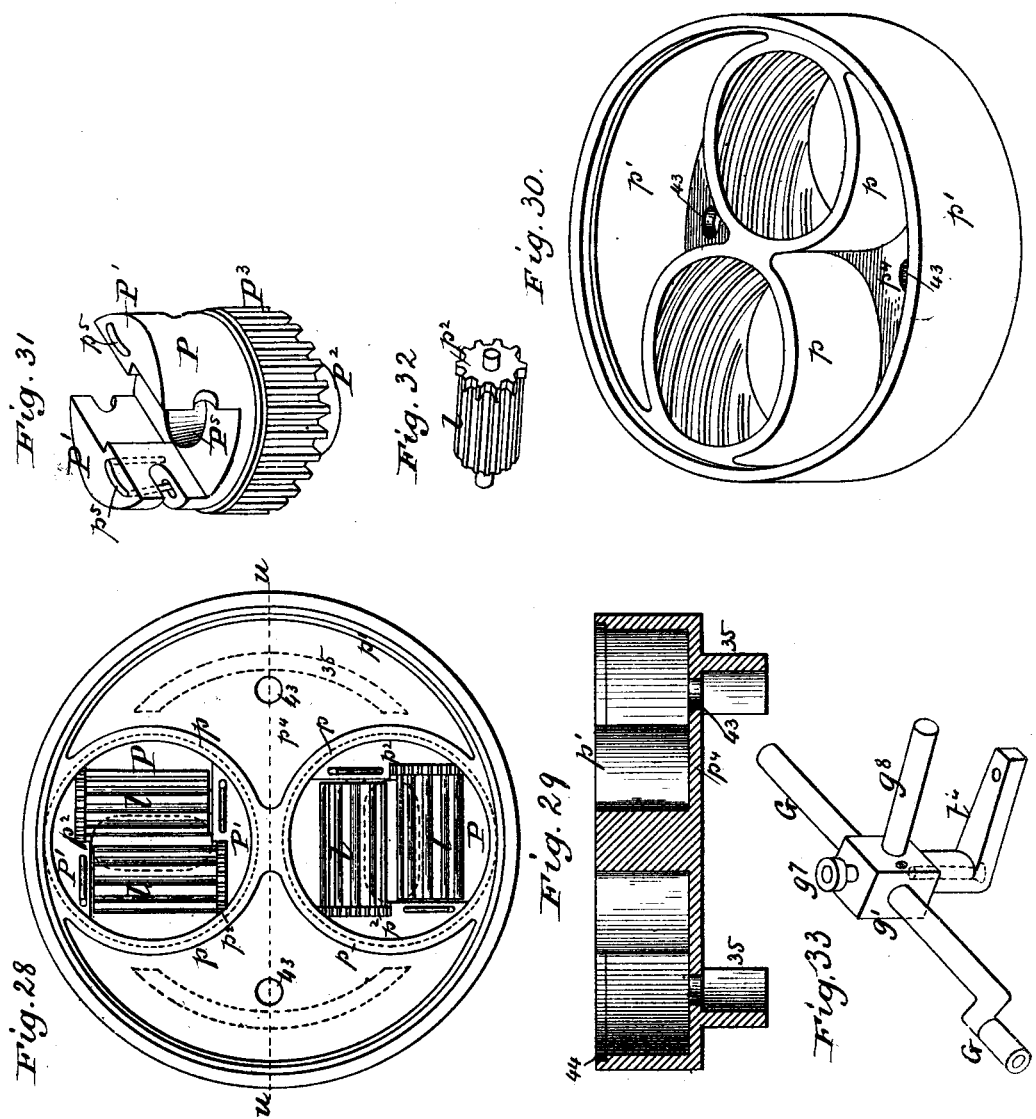

UNITED STATES PATENT OFFICE.

HOSMER TUTTLE, OF CEDAR RAPIDS, IOWA.

GRAIN-BINDER BAND-MAKING MACHINE.

SPECIFICATION forming part of Letters Patent No. 547,696, dated October 8, 1895.

Application filed June 30, 1888. Serial No. 278,716. (No model.)

*To all whom it may concern:*

Be it known that I, HOSMER TUTTLE, a citizen of the United States of America, residing at Cedar Rapids, in the county of Linn and State of Iowa, have invented certain new and useful Improvements in Grain-Binder Band-Making Machines, of which the following is a specification, reference being had therein to the accompanying drawings.

My invention relates to grain-binders in which straw is used for the band, and the object of my invention is to provide a machine capable of making a band from straw taken from and forming a part of the grain cut by the harvester carrying the grain-binding mechanism in which said straw-band is used. I accomplish this object by the construction illustrated in the accompanying drawings, in which—

Figure 6:
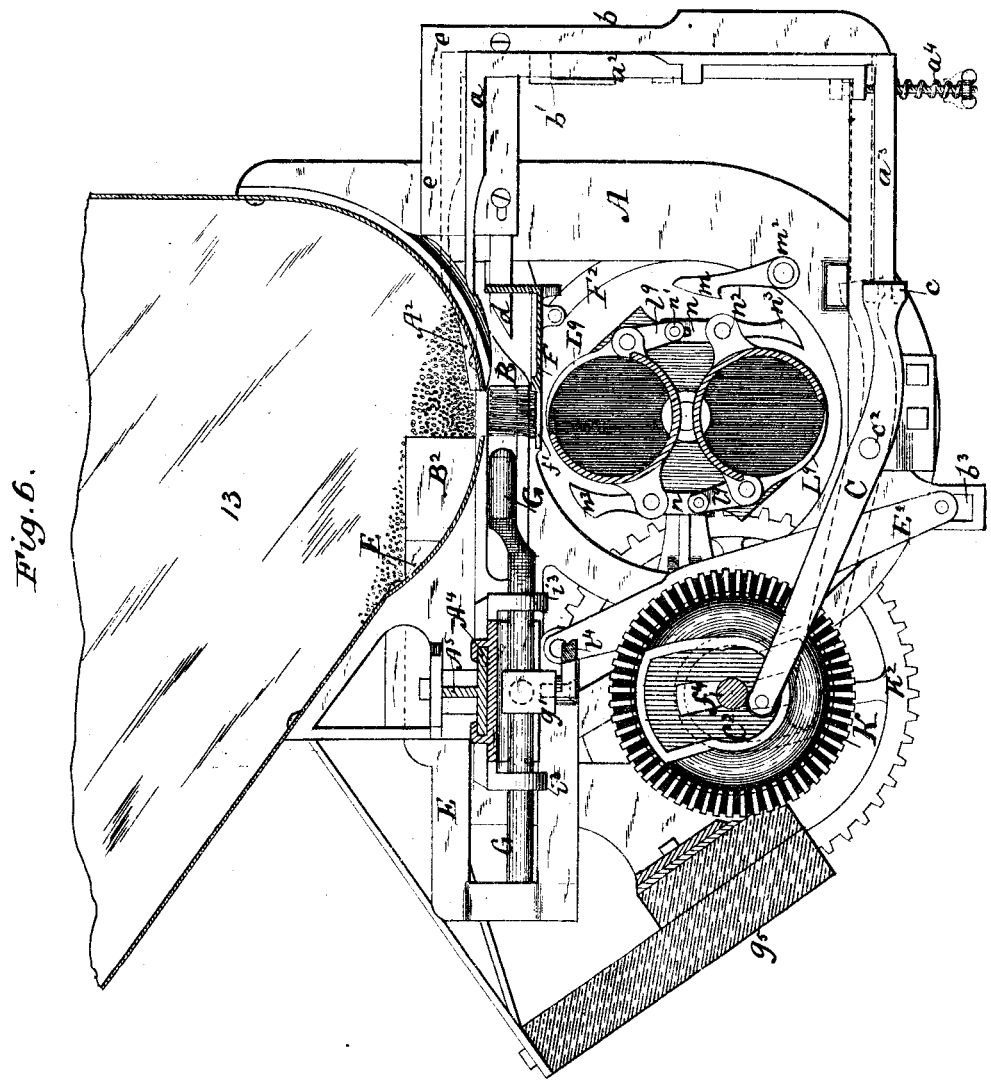
Figure 7:
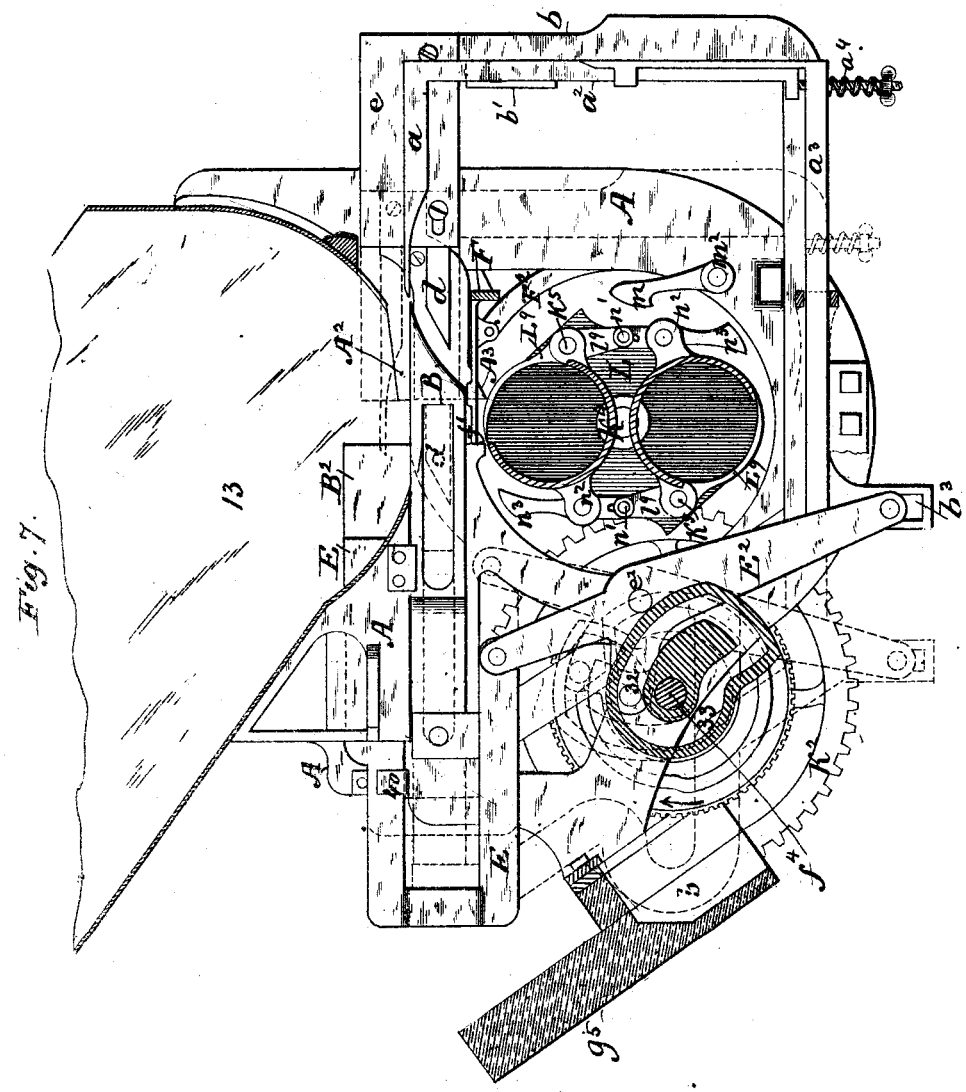
Figure 8:
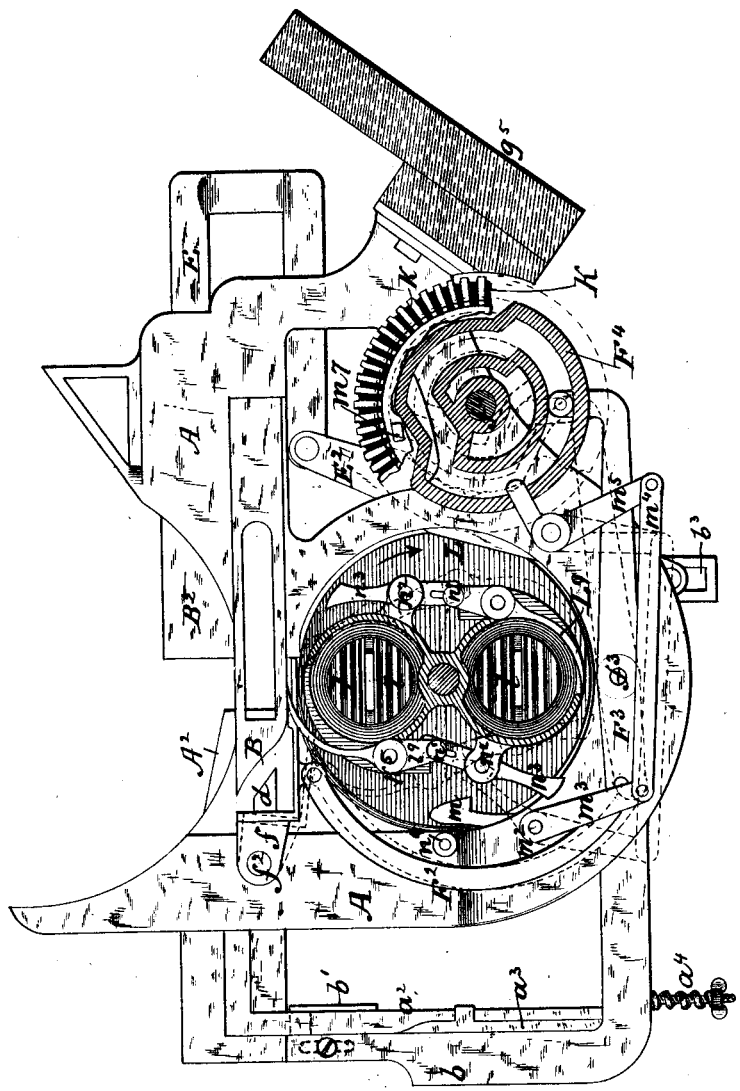
Figure 9:
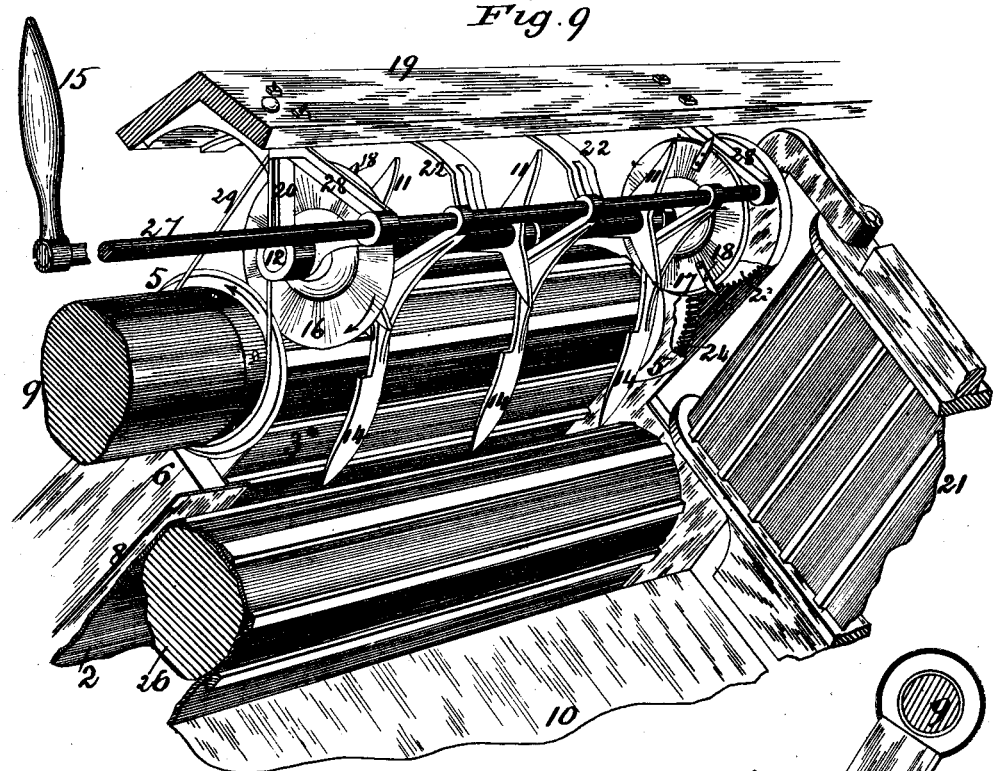
Figure 10:
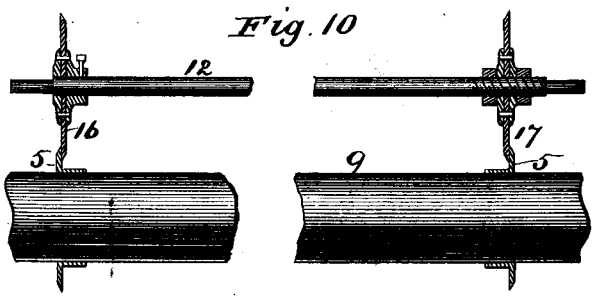
Figure 12:
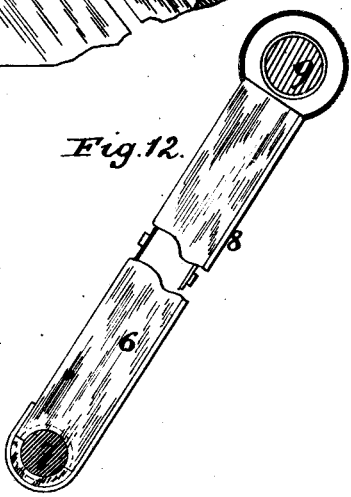
Figure 11:
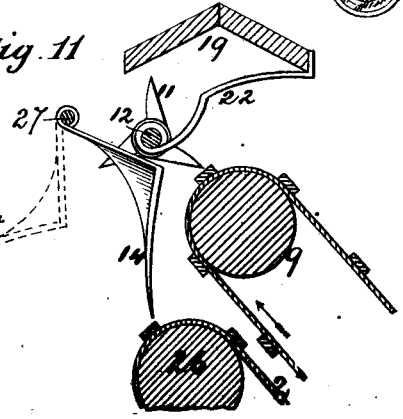

Figure 1 is a perspective view taken from the rear of a grain-binder constructed in accordance with my invention. Fig. 2 is a front elevation showing the band-twisting cylinder and the course taken by the band over its supporting-guide and around the end of the trip-lever used to regulate the amount of band produced ahead of its employment by the binder as the latter draws upon it at intervals. Fig. 3 is a top view of the band-twisting mechanism and of the mechanism used to feed the straw to be twisted, but with the straw hopper removed. Fig. 3$^a$ is a top view of the straw-supporting table removed from the twisting-cylinder frame. Fig. 4 is a longitudinal vertical section of the straw-twisting mechanism, showing also the straw-dividing needle and four motion-dividing fingers. Fig. 5 is a transverse vertical section of the straw-feeding and twisting mechanism on line $v\,v$ of Fig. 3. Fig. 6 is a transverse vertical section on line $w\,w$ of Fig. 3, with the finger G in front of said line. Fig. 7 is a transverse vertical section on line $x\,x$ of Fig. 3. Fig. 7$^a$ shows in full lines some of the parts of the mechanism in the position that is represented by dotted lines in Fig. 7. Fig. 8 is a transverse vertical section on line $y\,y$ of Fig. 3, looking toward the twister-head. Fig. 9 is a perspective view of the upper end of the elevating-aprons, the switch-fingers to direct a portion of the grain or straw from the binder-platform to the straw-band hopper, and also the revolving fingers to advance the straw and the circular cutters to cut it. Fig. 10 is a vertical section of the circular cutters with their shafts in elevation. Fig. 11 is a transverse vertical section of the parts shown in Fig. 9, but taken from the opposite end of the supporting-shafts. Fig. 12 is a transverse vertical section of the elevating-apron shafts and the board dividing the two canvases in the plane of the circular cutter, and also showing the bottom plate to cover the opening between the edges of the canvas and prevent straw from entering between the two surfaces of the upper elevating-apron. Fig. 13 is a perspective view of the straw-dividing fingers, their guide-plate, and operating-chain. Fig. 14 is a rear view of a portion of the twisting-cylinder head with the pivoted cutter partly open. Fig. 15 is a vertical section of the parts shown in Fig. 14. Fig. 16 is a top view of the twisting-cylinder and mechanism for advancing the back end of the cylinder and advancing the straw therein. Fig. 17 is a vertical section of the straw-feed needle and its guard. Fig. 18 is a transverse section of the twisting-cylinder head on line $z\,z$ of Fig. 20, showing the twisting device therein. Fig. 19 is a perspective of a portion of the straw-supporting table over the twisting-cylinder and one of the wires to prevent the straw from remaining upon the supporting-table, the retaining-cap being turned on its edge to show the spring-coil. Fig. 20 is a front view of a portion of the twisting-cylinder head and the rollers to twist and advance the straw. Fig. 21 is an enlarged view in section of a portion of the twisting-cylinder head. Fig. 22 is a side view of the needle and the slotted arm carried by said needle. Fig. 23 is an end view of the needle-frame and slotted arm. Fig. 24 is a top view of the needle and of the slotted arm. Fig. 25 is a side view of the ram and its operating-lever. Fig. 26 represents in side and in end view the straw-pressing fork. Fig. 27 is a side view of the angular arm used to elevate and depress the straw-pressing fork. Fig. 28 is a front view of the sleeve in which are placed the slotted cylindrical frames carrying the band-twisting rollers. Fig. 29 is a transverse section of the sleeve on line $u\,u$ of Fig. 28. Fig. 30 is a perspective view of the sleeve shown in Fig. 28. Fig. 31 is a perspective view of one of the slotted cylindrical frames used to carry the twisting-rollers. Fig. 32 is a perspective view of one of the band-twisting rollers. Fig. 33 is a perspective view of one of the fingers used to straighten the straw received from the hopper, and also its guiding-block, steadying-arm, and operating-link.

In said drawings the sides of the elevator of a harvester are shown at 46, to which is secured a plank $g^5$, that supports nearly the whole of the band-making mechanism by means of castings and braces, hereinafter described, the main driving-shaft $K^4$ of said mechanism being also supported at one end in a bearing carried by a bracket 47, secured to the elevator-frame. The grain-receiving platform is indicated by the numeral 1 and is of ordinary construction. The bottom elevating-apron, also of ordinary construction, is shown at 2, and over the latter is mounted the top apron, which is formed in two parts 3 and 4, these two parts being required on account of the circular cutter 5, placed on the upper roller of said apron; but to guide and support the inner edges of the parts 3 and 4 a board 6 has its lower end retained on the bottom roller 7 and its upper end free to swing with said canvas, and to the under edge of said board 6 a sheet-metal plate 8 is secured to cover the openings at the edges of the canvas and prevent straw from entering between the two surfaces of the elevating-apron, and said plate 8 encircles the portion of the apron passing around the lower roller of the upper apron. The elevated grain having passed over the upper roller 26 of the apron 2 falls upon the binder-platform 10 until arrested by the needle during the operation of binding a gavel. It accumulates in front thereof and backs up until the pointed revolving fingers 11, secured some distance apart on the feed-shaft 12, retained in bearings 20, engage with the straw and advance it toward the hopper 13 of the band-twisting mechanism, said hopper having its upper end secured to the upper tie-board 19 and its lower end to the frame of the twisting mechanism, and the latter is secured to the plank $g^5$, uniting the sides of the elevator-frame.

The above-described operation takes place when the switch-fingers 14 are thrown up, as shown by dotted lines in Fig. 11; but if said switch-fingers 14 are turned down, as shown by full lines in Figs. 9 and 11, then the whole current of grain or straw is diverted upward to the revolving fingers and advanced by them to the hopper 13. The size of this current can be regulated or it can be stopped entirely by inclining the switch-fingers more or less away from the elevating-aprons by means of a hand-lever 15 on one end of the shaft 27, carrying said switch-fingers, the lever 15 being locked in any well-known manner. The shaft 12 carries also two revolving cutters 16 and 17 to cut the proper length of straw, in connection with the two circular cutters 5 on the upper roller of the apron 3, one of said cutters 5 being at the front end of the roller 9. The revolving cutters 16 and 17 have radial fingers 18, extending beyond the periphery of said cutters, to force the straw between the cutters and prevent it from slipping back. To the under side of the upper tie-board 19 of the harvester is secured one of the bearings 20 of the shaft 12, and the other bearing is carried by the elevator-frame. The butt-canvas is shown at 21. To the under side of the tie-board are also secured the slotted strippers 22, that straddle the revolving fingers 11 and prevent the straw from becoming wound around them.

Motion is given to the shaft 12 by means of a gear 23 upon said shaft meshing with a gear 24 upon one end of the upper roller 9 of the apron 3, and said roller is revolved, as usual, by means of a gear 25, meshing with a pinion upon the gudgeon on the end of the upper roller 26 of the lower elevating-apron. The shaft 27, carrying the switch-fingers 14, is supported in bearings 28, secured to the under side of the tie-board 19. To prevent the cutters 5 and 16 from spreading apart, a bearing-wire 29 is passed around the upper roller 9 of the apron 3, close to the outside of said cutter 5, and said wire is secured to the tie-board 19 close to the bearing 20 of the shaft 12.

The cutters 5 and 17 are to cut the butts of the straw evenly, so that said straw will run freely down the hopper 13, and said hopper is made slightly wider at its lower end to prevent any friction of the ends of the straws against its sides. The top of the hopper is left open, so that the attendant can watch the delivery of the straw; but a wire covering or a few wires 30 are secured over the top of the hopper to keep the wind from blowing the straws from said hopper. The lower end of the hopper is preferably curved or semicircular to cause the straw to descend to the lowest point of said concave end, where it has a slotted opening 31 the whole length thereof for the passage of the straw.

To force a few straws at a time downward and separate them from the mass in the hopper the following devices, located at the central point of the length of the hopper, are used—viz: a pressing-fork having two horizontal branches $a$, united to a vertical stem $a^2$, capable of a vertical up-and-down motion. This stem is guided between hooked lugs $b'$, projecting from the needle-driving frame $b$, which is rectangular at one end and is elevated by the angular arm $a^3$ having a loose sliding connection with the stem $a^2$, and is inserted loosely between claws $c$ in one end of the lever $C$, pivoted at $c^2$ to the middle casting $A$ of the frame supporting the operating mechanism in the middle of the hopper. When the fork $a$ has been elevated, it occupies the position shown by dotted lines in Fig. 6. The fork is then advanced toward the middle of the hopper by the needle-frame $b$ and its operating mechanism until said fork occupies the position shown by dotted lines in Fig. 7 and rests upon the straw. The fork is then depressed upon said straw by means of the cam $C^2$, operating upon one end of the lever C, and if a larger amount of straw has been gathered under the fork than will allow it to descend the full distance the spring $a^4$, mounted on the rod $a'$, passing through the angular arm $a^3$, permits said arm to descend against the end of the spring $a^4$ and produces a steady pressure upon the straw without strain of the parts. The straw then rests upon a slotted arm $d$, vertically adjustable upon the needle-frame, so as to regulate the size of the throat between the beveled end of said arm and the needle B.

To keep the straws from rolling or moving in front of the fork $a$ while the latter is advancing, there is a movable ram or abutment E in the form of a plate standing on its edge, that is retained parallel with the frame A by the hook 40 and the sides of a groove in the frame A, and is reciprocated horizontally by means of a lever $E^2$, pivoted at $e^2$ to the middle casting A, said lever $E^2$ having its lower end provided with a pin adapted to play in a slot $b^3$, formed in a pendent arm of the needle-frame, so that as it is swung the needle B is retracted and the ram E is advanced toward the fork until the forward edge is nearly in the same plane as the end of the branches $a$ of said fork. The upper end of the lever $E^2$ then moves the ram in one direction, while the lower end of said lever moves the needle in the opposite direction. The lever E has an arm 32 on one side, having a roller at the end thereof that travels in a cam 33 upon the shaft $f^4$.

The needle B has a straight flattened body, having its top surface wedge-shaped at its front end, with a recess under said front end to receive the stationary plate $A^3$ in said recess, and said needle has its rear end rigidly secured to the upper end of its carrying-frame.

From the top of the needle B projects a fin $B^2$, the function of which is nearly similar to that of the ram—that is, it advances the straw toward the middle of the concavity of the hopper and in front of the path traveled by said fin $B^2$. The frame A has a projection $A^2$ to arrest the straw in that side of the hopper and form a shield for the needle when the latter has advanced nearly to the end of its forward stroke, and under said projection $A^2$ the frame A carries a vertical plate $A^3$, Fig. 17, that enters into the vertical slot in the lower face of the needle and prevents said needle from pushing the straw laterally, and as the under side of the needle is beveled downward from its point said beveled portion forces the straw through the throat formed between it and the slotted arm $d$ and brings it upon the vertically-oscillating table F, which is a flat plate having its outer edge flanged upward at 41, and said table supports the straw. The outer edge of said table has arms $f$, by which it is pivoted to the frame A at $f^2$, and it is moved up and down a short distance by means of the bent rod $F^2$, that has its lower end pivoted to one end of the lever $F^3$, Fig. 8, that is pivoted to the frame A at $f^3$, and has its opposite end provided with a roller that travels in the groove of a cam $F^4$, mounted upon the shaft $f^4$. The table F has a series of bent wires $f^5$, Figs. 19 and $3^a$, one end of which stands up to keep the straw from entering in the space between the top of the table and the bottom of the hopper and gives a back support to the straw against the tendency of the needle to push it laterally. To retain said wires in the position shown in Fig. 19, and in the other figures wherein they appear, the rear end of each wire is bent laterally at $f^6$ and rests in a groove in the table, and to retain the wires $f^5$ in said vertical position, but permit them to be laid horizontally when the fingers G pass over them, one end of a coiled spring $f^7$ is secured to the wire and has its opposite end resting upon the table. The horizontal portion of said wires $f^5$ $f^6$, and also the spring $f^7$, are covered by a cap F' to inclose and protect them. The straw is thus clamped in the middle of its length between a shelf $f'$, projecting centrally from the edge of the table, and the bottom of the needle. Now, the needle having separated the proper number of straws to form a strand for the band, the next operation is for the dividing-fingers G, Fig. 33, consisting of a straight rod having an offset at one end, said offset having a roller at its end to diminish friction, to enter the opening formed between the straws in the hopper and the clamped straws at points close to the side of the needle, in fact within the body of said needle, as the latter is slotted at $b^4$ for that purpose. These fingers travel upon the table F close to its edge, and are reciprocated by means of chains $g$ and links $t^4$, connected to the boss $g'$, secured to the fingers G, said chains $g$ passing around sprocket-wheels $g^2$, having their shaft mounted in bearings $g^3$, projecting from the side of the angular bar $g^4$, the latter being secured to a plank $g^5$, extending across the elevator-frame. The end pieces $A^2$ $A^3$ of the frame are united by the bar-casting $g^4$ and by the flat plate $A^4$, having a strong longitudinal vertical rib $A^5$, that is cut at two points $a^6$ for the passage of the roller $g^7$, attached to the square boss $g'$, having upon one side a steadying-arm $g^8$. The end of this arm is supported upon a hooked flange $i$ pendent from a cross-head I, that rides upon and is guided by the two long edges of the plate $A^4$, said cross-head having flanges $i^2$ at each end that rest upon said plate, the flanges at one end being chambered or transversely slotted for the reception of the roller $g^7$. The cross-head has also a pendent ear $i^3$ on its two sides, and said ears are perforated to receive the finger G and permit it to play lengthwise therethrough, although said finger is prevented from rotating, as it is pinned to the boss $g'$.

The path of the fingers G is as follows: They advance into the straw alongside of the middle casting A with their offset within the slot $b^4$ of the needle, and then the right-hand finger travels toward the right side of the machine and the left-hand finger travels toward the left side, with the end of the offset traveling upon the table F in a direction parallel to its long inner edge, until the slots $a^6$ in the plate $A^4$ are reached, at which points the fingers are retracted and the guide-roller $g^7$ follows the rear side of said plate $A^4$ to the inner slot $a^6$ or beginning of the path above stated. The chains $g$, operating the fingers, are driven in opposite directions by means of the two bevel-gears K upon the shaft $f^4$, meshing with pinions $k$ on the under side of the sprocket-wheels carrying the chains.

To hold the separated straw in proper position, wires $h$ are passed transversely through the longitudinal rib $A^5$. Said wires are looped at $h^2$ at one end to keep the separated straw apart, and at the other they are swiveled to a bent lever $h^3$, that is pivoted to the angular bar $g^4$ and has its lower end provided with a roller entering a groove in the cam H. The dividing-finger in its travel advances nearly to the ends of the straw. At this time the straw is held at five different places ready to be seized by the fingers mounted on the twisting-cylinder, being held at the center over the shelf $f'$, over the shelves $t^3$, projecting from the inner edge of the table F, and in connection with the wires $h$, the bent end $h^9$ of which enters the notch in the edge of said shelves $t^3$ and the fingers G.

The fingers G do not pass through the loop in the wire, but pass under the wire and under its loop, and to permit said operation the wire is swiveled to its lever $h^3$, as follows: To one side of the upper end of said lever is pivoted a lug $h^4$, Fig. 13, and said lug is perforated to receive the wire $h$. To steady the extreme end of said wire a sleeve $h^5$ is secured thereon and also a steadying-fork $h^6$, said sleeve and fork being retained by a nut $h^7$ on the end of the wire and a nut $h^8$ in front of the lug $h^4$. The branches of the fork $h^6$ straddling the lever $h^3$, said lever retains the wire in its normal position, as shown in Fig. 13; but at the time that the finger G strikes the pendent end $h^9$ of the looped wire the cam H, controlling the lever $h^3$, depresses the upper portion of said lever, as shown by dotted lines in Fig. 5, and said lever depresses the lower branch of the fork $h^6$ and gives a quarter-revolution to said wire and permits the finger G to pass under. At the same time that the wire receives this quarter-revolution it is pulled back by the lever $h^3$ to a position ready to be inserted between the straws that have been separated by the fingers and those above, and it is inserted between said straws by the lever $h^3$ resuming the position shown in full lines in Fig. 5. The upper edge of said lever bearing against the under side of the upper branch of the fork $h^6$ gives to the wire a quarter-turn and brings its looped end at the same time forward between the straws to the position shown in Fig. 5.

Motion is given to the sprocket-wheel $g^2$, carrying the chains $g$, by means of the beveled gears $k$, secured to the under side of said sprocket-wheels, and said gears mesh with beveled gear-wheel K, mounted upon the shaft $f^4$, carried in bearings in the frames A, $A^2$, and $A^3$, and upon one end of the latter shaft is secured the gear-wheel $K^2$, that meshes with the pinion $K^3$ upon the shaft $K^4$ of the straw-twisting cylinder L, which constitutes the main driving-shaft of the band-forming mechanism. This twisting-cylinder consists of two segmental cylinders placed side by side and having their adjacent sides united and mounted upon a common shaft, and besides this construction each segmental cylinder consists of two sections. The forward section $L^2$ is preferably longer than the rear section $L^3$. Said sections are connected together by the central shaft $K^4$ and by two parallel rods $K^5$. Said shaft and rods are secured to the part $L^2$, and the part $L^3$, which has a closed end, is allowed to slide upon said rods and shaft. When the parts $L^2 L^3$ are separated, the straw is received in one of the segmental cylinders, and when brought together the straw is advanced butt foremost to and between the twisting-rollers $l$, said rollers also clamping and feeding the straw forward. The section $L^3$ is pulled back away from the section $L^2$ by means of the lever $L^4$, having a forked jaw with pins or lugs entering a groove in the sleeve-stem $L^5$ of said section $L^3$. The opposite end of the lever $L^4$ has a roller that enters into the groove of a cam $L^6$ upon the shaft $f^4$.

To lock the fingers $L^9$ down so that they will not fly open by centrifugal motion, the rods $K^5$, carrying said fingers, have at one end the crank-levers $k^5$, Fig. 16, the free ends of which are adapted to engage with longitudinal ribs $k^6$, projecting from the side of the hub or stem $L^5$ of the section $L^3$, so that when the two lengths $L^2 L^3$ of the twisting-cylinder are close together the fingers $L^9$ are locked; but when these lengths $L^2 L^3$ are apart, as shown in Fig. 16, the cranks are free to escape, as the ribs $k^6$ do not extend close to the head L.

To trim the straw of proper length at the time it is received in the twisting-cylinder, each head of said cylinder is provided with a stationary blade $L^7$ to cut it, in connection with a curved blade $L^8$, attached to each of the end fingers $L^9$, that grasps the straw that has become packed under the needle. Two other fingers, as $L^9$, alongside thereof but narrower and unprovided with a blade, are provided for each of the two lengths $L^2 L^3$. The three fingers on each section of the cylinder are attached to the same hub, and said hub is secured on the rod $K^5$. Two additional fingers $L^{9*}$ are secured to the rod $K^5$ and are placed alongside of the needle, one on each side thereof, and they control the action of all the others. Each finger has an arm $l^9$ extending beyond its hub, and to force the fingers open one end of an arm $m$ is advanced against a lug $n'$ on the end of the arm $l^9$ and pushes it toward the shaft $K^4$, and thus opens the point of the fingers in position to engage with and carry the straw within the segmental cylinders. The arm $m$ is secured at $m^2$ to a rod passing through the frame A, and upon said rod is secured an arm $m^3$, having its lower end united to a connecting-rod $m^4$, pivoted to one arm of a bell-crank lever $m^5$, having its upper arm in the path of a pin $m^7$, projecting from the side of the gear K on the shaft $f^4$. To close the fingers $L^9$, one end of a lever $n$, pivoted to an arm $n^2$, projecting from the surface of the segmental cylinders, is pivoted (in a slot) to the end $l^9$ of said fingers, and the opposite end $n^3$ of the lever $n$ extends beyond the path traveled by the segmental cylinder in its revolution and strikes against a roller $n^4$, Fig. 8, mounted on a pin projecting from the side of the frame A. The fingers are locked by the mechanism $K^5$ $k^5$ $k^6$, before described. After the fingers $L^9$ have caused the straws to fall into one of the segmental cylinders the movable section $L^3$ is advanced against the section $L^2$, and with it the straw is advanced between the clamping and twisting rollers $l$, where it overlaps the ends of the straw previously passed between said twisting-rollers.

The twisting mechanism is inclosed in and supported by a cylindrical bearing $P^4$, having cogs on its inner surface. Said bearing is bolted to the end frame $A^2$. Within the bearing $P^4$ is placed a sleeve $p'$, having therein and formed integral therewith two smaller sleeves $p$, and within said sleeves $p$ are placed the diametrically-slotted frames P.

Each pair of twisting-rollers is carried in the slotted frame P. Its inner end is cylindrical in part, but has two segmental portions P', as shown in Figs. 20 and 31, that carry bearings for the journals of the twisting-rollers. The frame P has at one end a boss $P^2$, upon which is secured a pinion $P^3$, that meshes with a stationary gear $P^4$, having an internal row of cogs to give a planetary motion to the pinions $P^3$. The boss $P^2$ is hollow, and its central perforation $P^5$ is elliptical at its inner end and circular at its outer end, and leads into a sheet-metal funnel $P^6$, that directs each single strand of the straw band toward the clamping-rollers $P^7$. To give a rotary motion to the twisting-rollers $l$, each cylindrical frame P is loosely fitted into a sleeve $p$, carried by a large sleeve $p'$, retained in position by the cylindrical recess 44 in its edge fitting around the end 42 of the section $L^2$, and the bolts $p^3$ retaining the cap-plate $P^8$ united to said end 42, and each sleeve $p$ has its internal surface provided with a triple or quadruple thread, (of great inclination, being about one inch pitch,) and the gear-wheel $p^2$, secured upon one end of each of the twisting-rollers, meshes with the internal screw-thread of the sleeve $p$ and thereby obtains its rotation. The outer end of the boss $P^2$ is also faced and shouldered at $p^7$ to form a journal that is loosely fitted into the cap-plate $P^8$ of the twisting-cylinder. This cap-plate is connected with the forward end 42 of the twisting-cylinder $L^2$ by means of two bolts $p^3$, located near the rim of said cap-plate in Fig. 2, the head of one of said bolts being shown in Fig. 21, said bolts passing through the holes 43 in the sleeve $p'$; but to prevent the frames P and the sleeve $p'$ from being jammed tightly between said parts $P^8$ and 42 of the section $L^2$ that retain them the sleeve $p'$ has side lugs 35 to bear against the cap-plate $P^8$. Although I have called the part $p$ a "sleeve," the two sleeves $p$ are united at their inner ends to the sleeve $p'$ by a disk $p^4$, having two large perforations, Fig. 30, from the rim of which the rings $p$ project, and each of said rings contains one of the cylindrical frames P. The rollers $l$ have their journals received in bearings 45 in said frames P.

To render the twisting-rollers $l$ yielding to receive more or less straw between them, the journal at one end of each roller bears against a wire spring $p^5$, Figs. 18 and 31, bent in the form of a hook, having its longest end driven in the segmental portion P' of the frame P and its shortest end bearing against the journal of the twisting-roller. The lower clamping-roller $P^7$ on the main frame has rigid bearings, but the upper clamping-roller has its journals pressed upon by bearings retained in the bearing-supports $q$, and within said supports are placed the springs $q^2$, that press at one end upon the upper journal-bearing and have their upper end adjustably retained by screws $q^3$. The two clamping-rollers have gears at one end that mesh together. The shaft of the lower roller $P^7$ carries upon its extremity a bevel gear-wheel $q^4$, that meshes with a bevel-gear $q^5$ upon the shaft $f^4$ and obtains its motion therefrom.

To arrest the making of the band R when a sufficient length has been made ahead of the binding mechanism, said band after leaving the clamping-rollers passes over one of the sheaves $r$ at the upper end of an elevated arm $R^2$, secured to the front elevator-board of a harvester. From said sheave $r$ it passes down to and around a sheave $r^2$ on the outer end of a bell-crank lever $R^3$, pivoted at $r^3$ to a metal arm $r^4$, projecting from the rear elevator-board of the harvester. From the sheave $r^2$ the straw band passes up and around the second sheave $r$ on the end of the arm $R^2$, and thence around a sheave $r^4$ to the binding mechanism. The inner or rear end of the lever $R^3$ extends but a very short length beyond its pivot, but it engages with the movable half of a clutch $r^5$, mounted upon the shaft $K^4$ of the twisting-cylinder, the other member of the clutch forming a part of the hub of the driving sprocket-wheel S. As one end of the lever $R^3$ is much longer and heavier than the other, its weight is used to regulate the amount of band produced ahead of the binder. When the binding mechanism is pulling on the band, it elevates the outer or front end of the lever R³ and throws the members of the clutch into gear. The band-producing mechanism then produces more band and the front end of the lever gradually drops down until the members of the clutch become disconnected and the band-producing mechanism is arrested, the lever then resting upon a hook $t$, secured to the frame of the binder, as shown in Fig. 1, or upon a shelf $t^2$, as shown in Fig. 2. As the lever R³ is extended so far from its pivot, I find it useful to direct its outer or front end between guide-rods T, as shown in Fig. 2.

Although I have described as "aprons" and "elevating-aprons" the means used to carry and elevate the grain, it will be understood that chains or other well-known carriers may be used with my improvements without departing from the spirit of my invention.

Having now fully described my invention, I claim—

1. In combination with a straw band making mechanism the bottom elevating apron of a harvester the top elevating apron consisting of two parts, and a plate covering the joint between said parts substantially as and for the purpose described.

2. In combination with the bottom elevating apron of a harvester, the top elevator consisting of two parts, its upper roller, and cutter upon said roller between said aprons substantially as and for the purpose described.

3. In combination with a straw band making mechanism the bottom elevating apron of a harvester, the top elevating apron consisting of two parts, a roller at the top and bottom of said parts and a dividing board between the edges of said parts substantially as and for the purpose described.

4. In combination with the bottom elevating apron of a harvester, and the top elevating apron and its upper roller with cutters upon said roller, the shaft 12 above said upper roller the cutters and the fingers 11 thereon substantially as described.

5. In combination with the bottom elevating apron of a harvester, the top elevating apron and its upper roller and cutters upon said roller with the shaft above said upper roller cutters and the fingers 11 upon said shaft and strippers 22 substantially as and for the purpose described.

6. In combination with the top and bottom elevating aprons of a harvester, a rotary straw feeding mechanism at the upper end of said apron, a hopper 13 located over the top elevating apron, the receiving end of said hopper being adjacent to the rotary feeder, said rotary feeder delivering the straw from the delivery side of the roller into the hopper, and a straw feeding and band twisting mechanism under the lower end of said hopper substantially as and for the purpose described.

7. In combination with the top and bottom elevating aprons of a harvester, a rotary straw feeding mechanism at the upper end of said aprons, an inclined hopper 13 located over the top elevating apron, the receiving end of said hopper being adjacent to the rotary feeder, delivering the straw from the delivery side of the roller into the hopper, said hopper having its lower end wider than its upper end, and a straw feeding and a band twisting mechanism under the lower end of said hopper substantially as and for the purpose described.

8. In combination with the top and bottom elevating aprons of a harvester, a rotary straw feeding mechanism at the upper end of said aprons, a hopper 13 located over the top elevating apron, the receiving end of the hopper being adjacent to the rotary feeder, the rotary feeder delivering the straw from the delivery side of the roller into the hopper, a straw feeding and a band twisting mechanism under the lower end of said hopper, and wires located over said hopper substantially as and for the purpose described.

9. In combination with the top elevating apron of a harvester its top roll and cutter thereon, the shaft 12 above said top roll, the cutter thereon, and the wire-bearing uniting the top roll with the support of the shaft 12 substantially as and for the purpose described.

10. In combination with the top elevating apron of a harvester its top roll and cutters thereon and the shaft 12 carrying also cutters thereon, with the gear 23—24 upon said top roll and shaft substantially as and for the purpose described.

11. In combination with the top elevating apron of a harvester its top roll and cutters thereon, and the shaft 12 and cutters thereon with radial fingers 18 attached to a pair of said cutters substantially as and for the purpose described.

12. In combination with the bottom elevating apron of a harvester and the top elevating apron having rotary knives 5 on its upper shaft, a shaft 12 having fingers 11 and rotary knives 16 and 17 thereon, the top elevating apron consisting of two parts 3 and 4 having their surfaces in the same plane, a shaft 27 opposite the delivery opening between the top and bottom elevating aprons, and a series of switch fingers upon said shaft and placed only opposite said opening, and an inclined straw receptacle located with its mouth above the upper elevator and opposite the switch fingers substantially as and for the purpose described.

13. In combination with the top elevating apron of a harvester and a rotary straw feeding mechanism at the upper end of said aprons, a hopper 13 having an inclined bottom over said top elevating apron a substantially vertical lower end, a segmental concave between said inclined bottom and vertical lower end and having a slot in the bottom of said concave and a straw feeding mechanism under said hopper substantially as and for the purpose described.

14. In combination with the top and bottom elevating aprons of a harvester and the hopper over the said top apron, the needle B and its frame, the fork $a$ carried by said needle frame and adapted to enter said hopper, substantially as and for the purpose described.

15. In combination with a straw hopper, the needle B and its frame with the fork $a$, its vertically carrying arms $a^3$ and a yielding connection between said fork $a$ and said arm substantially as and for the purpose described.

16. The combination of a straw hopper, the needle B and its frame with the slotted arm $d$ adjustably secured to said frame whereby an adjustable throat is formed between the end of said arm and the needle, substantially as and for the purpose described.

17. The combination of a straw hopper, the needle under said hopper, the needle frame, the ram E having its upper end entering said hopper and a connecting lever uniting it with the needle frame substantially as and for the purpose described.

18. The combination of a straw hopper, the needle under said hopper the needle frame having a pendent arm and slot $b^3$ therein, with the ram E having its upper end entering said hopper, and a connecting lever uniting said ram with the slot $b^3$ substantially as and for the purpose described.

19. The combination of a straw hopper, the needle under said hopper, and the fin upon said needle entering said hopper, substantially as and for the purpose described.

20. The combination of a straw hopper, the frame carrying said hopper, the bill $A^2$ projecting from said frame into the hopper with the needle B under said hopper and its fin entering said hopper opposite said bill substantially as and for the purpose described.

21. The combination of a straw hopper its supporting frame, the needle having a slot longitudinally in the under side thereof with the plate $A^3$ secured to the supporting frame and adapted to enter the slot in the needle substantially as and for the purpose described.

22. The combination of a straw hopper its supporting frame and table F pivoted to said frame and having a central shelf $f$ extending under the delivery opening of said hopper, and the needle adapted to pass between said hopper and shelf substantially as and for the purpose described.

23. The combination of a straw hopper, its supporting frame and table F pivoted to said frame, its connecting rod, the pivoted lever $F^3$ and its operating cam substantially as and for the purpose described.

24. The combination of a straw hopper, its supporting frame and table F pivoted to said frame with the bent wires $f^5$ pivoted to said table and yieldingly supported substantially as and for the purpose described.

25. The combination of a straw hopper its supporting frame and table F having the shelf $f'$, with the longitudinally and transversely movable fingers G and the needle B having a slot lengthwise of said needle for the reception of said fingers substantially as and for the purpose described.

26. The combination of a straw hopper, its supporting frame, the connecting plate $A^4$, the sprocket wheels $g^2$ chains $g$ and reciprocating fingers G substantially as and for the purpose described.

27. The combination of a straw hopper, its supporting frame, the connecting plate $A^4$ having transverse slots and a longitudinal rib, the sprocket wheels $g^2$ chains $g$ cross head I and fingers G substantially as and for the purpose described.

28. The combination of a straw hopper its supporting frame the connecting plate $A^4$, the fingers G passing under said plate and the wires $h$ passing above said plate parallel with the fingers and having a looped end $h^2$ substantially as and for the purpose described.

29. The combination of a straw hopper, its supporting frame the connecting plate $A^4$, the fingers G under said plate, the wires $h$ above said plate and having the loop $h^2$ at one end, the bent lever $h^3$ swiveled thereto at the other end and a cam to operate said lever substantially as and for the purpose described.

30. The combination of a straw hopper its supporting frame and table F having the shelf $f'$ and the shelves $t^3$ with the longitudinally and transversely movable fingers G and the wires $h$ parallel with said fingers and having the loop $h^2$ at one end and the pendent end $h^9$ adapted to enter a notch in the end of said shelves substantially as and for the purpose described.

31. The combination of a straw hopper its supporting frame the connecting plate thereof, the fingers G under said plate, the wires $h$ above said plate, the bent lever $h^3$ swiveled to said wires and the steadying fork $h^6$ straddling said lever substantially as and for the purpose described.

32. The combination of a straw hopper, its supporting frame, the transverse connecting plate thereof, the sprocket wheel $g^2$ the chain $g$, the arm $t^2$, the fingers G, the cross head I and the boss $g'$ carrying one end of the arm $t^2$ substantially as and for the purpose described.

33. The combination of a straw hopper its supporting frame and the straw feeding mechanism under said hopper with a straw band twisting cylinder transversely cut in two parts, one part being adapted to slide lengthwise against the other substantially as and for the purpose described.

34. The combination of a straw hopper, its supporting frame and the straw feeding mechanism under said hopper, with a straw band twisting cylinder consisting of two hollow segmental cylinders united side by side and transversely cut in two parts each part having fingers $L^9$ positively operated substantially as described.

35. The combination of a straw hopper its supporting frame and the straw feeding mechanism under said hopper with the straw band twisting cylinder transversely cut in two parts each part having fingers $L^9$ and cutters $L^8$ secured to the end-fingers of each part of the divided twisting cylinder substantially as and for the purpose described.

36. The combination of a straw hopper, its supporting frame, the straw feeding mechanism under said hopper, the straw band twisting cylinder transversely cut in two parts and the stationary gear $P^4$ with the frame P having a rectangular recess at one end a conical opening at the other and twisting cylinders in said rectangular recess substantially as and for the purpose described.

37. The combination of a hopper its supporting frame, the straw feeding mechanism under said hopper, the straw band twisting cylinder transversely cut in two parts, the stationary gear $P^4$ the disk $p^4$ having two rings $p$ internally screw threaded, the frame P and the twisting rollers $l$ and the cog wheels $p^2$ upon one end of each of said twisting rollers substantially as and for the purpose described.

38. The combination of a hopper its supporting frame, the straw feeding mechanism under said hopper, the straw band twisting cylinder the disk $p^4$ having two rings $p$ internally screw threaded, the frame P having an elliptical tapering hole $P^5$ therein and twisting rollers $l$ each having one end yieldingly supported substantially as described.

39. The combination of a hopper, its supporting frame the straw feeding mechanism under said hopper, the stationary gear $P^4$ and the two cylindrical frames P, and gears $P^3$ thereon, the twisting rollers $l$ and gears $p^9$ thereon, the internally threaded rings $p$ to revolve the gears $p^2$ and the spring bearing $p^5$ in said frame P to retain one end of the journals of each of the twisting rollers substantially as described.

40. The combination of a hopper its supporting frame the straw feeding mechanism under said hopper, the straw band twisting cylinder transversely cut in two parts, the revolving head $P^8$ and two conical funnels surrounding the opening leading from the twisting rollers substantially as and for the purpose described.

41. The combination of a straw band twisting cylinder transversely cut in two parts, the hopper having its delivery opening along the side of said cylinder and the straw feeding mechanism under said hopper with the longitudinally grooved clamping rollers $P^7$, both having gears upon their journal substantially as and for the purpose described.

In testimony whereof I affix my signature in presence of two witnesses

HOSMER TUTTLE.

Witnesses:
E. E. MASSON,
HARRY L. AMER.